(12) United States Patent
Xueyou et al.

(10) Patent No.: US 10,495,087 B2
(45) Date of Patent: Dec. 3, 2019

(54) COMPRESSOR AND METHOD OF ASSEMBLING COMPRESSOR

(71) Applicant: Danfoss (Tianjin) Ltd., Tianjin (CN)

(72) Inventors: Zhou Xueyou, Tianjin (CN); Ma Haiyun, Tianjin (CN); Wu Zhipeng, Tianjin (CN); Zhang Zhiguo, Tianjin (CN); Meng Zhiqiang, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 543 days.

(21) Appl. No.: 15/153,212

(22) Filed: May 12, 2016

(65) Prior Publication Data

US 2016/0344253 A1    Nov. 24, 2016

Related U.S. Application Data

(62) Division of application No. 13/742,417, filed on Jan. 16, 2013, now abandoned.

(30) Foreign Application Priority Data

Jan. 19, 2012 (CN) .......................... 2012 1 0017793
Jan. 19, 2012 (CN) .......................... 2012 1 0019264

(51) Int. Cl.
*F04C 18/02* (2006.01)
*H02K 7/08* (2006.01)

(52) U.S. Cl.
CPC ......... *F04C 18/0215* (2013.01); *H02K 7/083* (2013.01); *F04C 2230/603* (2013.01);
(Continued)

(58) Field of Classification Search
CPC .. H02K 7/083; H02K 13/16; Y10T 29/49236; Y10T 29/4924; F04C 18/0215;
(Continued)

(56) References Cited

U.S. PATENT DOCUMENTS 1,639,684 A * 8/1927 Bott .................. F16C 27/04
                                                   277/419
3,417,704 A * 12/1968 Pall ................... F04D 13/0613
                                                   384/276
(Continued)

FOREIGN PATENT DOCUMENTS

CN         1038860 A      1/1990

OTHER PUBLICATIONS

Indian Office Action for Serial No. 105/DEL/2013 dated Apr. 2, 2018.

*Primary Examiner* — Christopher S Bobish
(74) *Attorney, Agent, or Firm* — McCormick, Paulding & Huber LLP (57) ABSTRACT

A compressor and a method of assembling the compressor are provided. The compressor includes: a shell; a motor arranged in the shell, the motor having a stator, a spacer mounted with a first bearing therein, a drive shaft supported by the first bearing and a rotor fixed onto the drive shaft; a low bearing support; a positioning member positioning the second bearing and being connected to the low bearing support; and a second bearing connected to the positioning member and/or the low bearing support and supporting the drive shaft. Furthermore, the positioning member may be removed from or maintained in the compressor after it is assembled. The present disclosure can avoid the adverse effects of the gravity of the rotor and the drive shaft and/or the magnetic force between the rotor and the stator on positioning the bearings and the drive shaft and can improve positioning accuracy and assembling efficiency.

14 Claims, 5 Drawing Sheets

(52) U.S. Cl.
CPC .... *F04C 2230/604* (2013.01); *F04C 2240/52* (2013.01); *F04C 2240/56* (2013.01); *Y10T 29/4924* (2015.01); *Y10T 29/49236* (2015.01)

(58) Field of Classification Search
CPC .......... F04C 2230/603; F04C 2230/604; F04C 2240/52; F04C 2240/56
USPC ............................................ 417/410.4, 410.5
See application file for complete search history.

(56) References Cited

U.S. PATENT DOCUMENTS

| | | | | |
|---|---|---|---|---|
| 5,042,150 A * | 8/1991 | Fraser, Jr. | ............. | F04C 23/008 29/464 |
| 5,531,577 A * | 7/1996 | Hayase | ................. | F01C 21/102 417/410.5 |
| 5,549,466 A * | 8/1996 | Hori | ...................... | F04C 23/008 29/888.022 |
| 5,580,233 A * | 12/1996 | Wakana | .................. | F01C 21/02 384/213 |
| 5,818,131 A | 10/1998 | Zhang | | |
| 6,616,429 B1 * | 9/2003 | Weber | .................... | F04C 23/008 29/888.022 |
| 6,687,992 B2 * | 2/2004 | Quesada | ................ | F04C 23/008 29/464 |
| 7,137,796 B2 * | 11/2006 | Tsubono | ............. | F04C 18/0215 418/55.5 |
| 7,451,616 B2 | 11/2008 | Ro | | |
| 9,057,365 B2 * | 6/2015 | Han | .................... | F04B 39/0094 |
| 2014/0161649 A1 * | 6/2014 | Hayashi | .................. | F04C 23/008 417/410.5 |

* cited by examiner

COMPRESSOR AND METHOD OF ASSEMBLING COMPRESSOR

CROSS-REFERENCE TO RELATED APPLICATION

This application is a divisional application of prior U.S. patent application Ser. No. 13/742,417 filed on Jan. 16, 2013, now U.S. Patent Application Publication No. 2013/0189133, which claims priority to Chinese Patent Application No. 201210017793.9 filed on Jan. 19, 2012 in the State Intellectual Property Office of China and Chinese Patent Application No. 201210019264.2 filed on Jan. 19, 2012 in the State Intellectual Property Office of China, the disclosures of which are incorporated herein by reference.

BACKGROUND

1. Field

The present disclosure relates to a compressor and a method of assembling compressor, which, in particular, are suitable to a compressor with permanent magnet motor.

2. Description of the Related Art

A compressor may be used as a main component of a refrigerator. The performance and reliability of the compressor have a crucial effect on working efficiency and stability of the refrigerator. The performance and reliability of the compressor depend on accuracy of assembly to a large extent. Currently, a conventional compressor has a motor comprising a stator, a drive shaft and a rotor mounted on the drive shaft. The drive shaft may be supported by two bearings such that the drive shaft can be rotated around a rotation axis of the drive shaft. When the compressor is assembled, the two bearings must be positioned coaxially. Otherwise, it is difficult for the compressor to achieve a desired performance and reliability.

In the prior art, typically, one bearing is fixed and then the other bearing seated on the drive shaft is positioned with respect to the former bearing. Since the former has been fixed, the coaxial positioning to the two bearings can only be achieved by adjusting the latter bearing. However, in this case, the drive shaft has been mounted with the rotor, thus the latter bearing has to be adjusted against a magnetic force between the rotor and the stator and/or gravity of the drive shaft and the rotor. Therefore, a very large force is necessary to implement the coaxial adjustment to the two bearings. It may have an adverse effect on the positioning of the bearings and may cause a low positioning efficiency and lead to positioning errors.

As can be seen, in the conventional compressor and method of assembling the compressor, the bearings and the drive shaft cannot be positioned easily and accurately.

SUMMARY

In view of the above, a compressor is provided, which can eliminate disadvantageous effects of gravity of a rotor of a motor and a drive shaft and/or the magnetic force between the rotor and a stator on positioning bearings and the drive shaft.

A method of assembling a compressor is also provided, which can eliminate disadvantageous effects of gravity of a rotor of a motor and a drive shaft and/or the magnetic force between the rotor and a stator on positioning bearings and the drive shaft.

In accordance with an aspect of the present disclosure, a compressor is provided. The compressor may include:

a shell enclosed by a shell cover and a base at both ends respectively;

a motor arranged in the shell, the motor having:
 a stator having a stationary position relative to the shell,
 a spacer connected to the shell and mounted with a first bearing therein,
 a drive shaft, an end of which is supported by the first bearing, and
 a rotor fixed onto the drive shaft and being rotatable relative to the stator;

a low bearing support connected fixedly to the shell or formed integrally with the shell;

a second bearing supporting the drive shaft; and a positioning member configured to position the second bearing and connected to the low bearing support, the second bearing being connected to the positioning member and/or the low bearing support.

Further, the positioning member may be positioned with reference to the first bearing independently of the drive shaft and the second bearing.

Further, the positioning member may have a positioning face fitted to the second bearing.

Further, the positioning member may have a positioning hole, and wherein the positioning face is an inner face of the positioning hole, which is fitted to an outer face of the second bearing.

Further, the positioning hole may have a diameter greater than that of the drive shaft.

Further, the inner face of the positioning hole may be provided with a chamfer for guiding the second bearing into the positioning hole, and the outer face of the second bearing may have a chamfer.

Further, the inner face of the positioning hole may be a cylindrical face or a tapered face.

Further, the positioning member may be a positioning ring.

Further, the first bearing and the second bearing may be coaxial.

Further, the second bearing may be a thrust bearing or may include a thrust bearing, the thrust bearing being perpendicular to a rotation axis of the drive shaft.

Further, the stator may be provided with a flange at its outer periphery, the flange being connected to an inner wall of the shell to fix the stator to the shell.

Further, the compressor may be a refrigeration compressor with a permanent magnet motor.

In accordance with another aspect, a method of assembling a compressor is provided. The method may include steps of:

(a) providing a shell, a low bearing support, a positioning member, a second bearing, as well as a spacer, a stator, a drive shaft and a rotor of a motor;

(b) mounting the stator and the spacer of the motor fixedly in the shell, the spacer being mounted with a first bearing;

(c) fitting an end of the drive shaft to the first bearing and fixing the rotor onto the drive shaft;

(d) connecting the low bearing support to the shell fixedly;

(e) positioning the positioning member with reference to the first bearing and connecting the positioned positioning member to the low bearing support fixedly; and (f) positioning the second bearing and the drive shaft with reference to the positioning member such that the first bearing and the second bearing are coaxial, and connecting the positioned second bearing to the positioning member and/or the low bearing support fixedly.

The method may further include:

(g) removing the positioning member from the low bearing support.

Further, the positioning member may have a positioning face fitted to the second bearing.

Further, the positioning member may have a positioning hole, and the positioning face may be an inner face of the positioning hole, the inner face being fitted to the outer face of the second bearing.

Further, the positioning hole may have a diameter greater than that of the drive shaft, and wherein in the step (e), the positioning member is positioned after the drive shaft passes through the positioning hole, and wherein in the step (f), the second bearing is inserted between the positioning hole of the positioning member and the drive shaft such that the outer face of the second bearing is fitted to the inner face of the positioning hole and the inner face of the second bearing is fitted to the outer face of the drive shaft.

Further, the inner face of the positioning hole may be provided with a chamfer for guiding the second bearing into the positioning hole, and the outer face of the second bearing may have a chamfer.

Further, the positioning member may have a positioning face fitted to the second bearing.

Further, the positioning member may have a positioning hole, and the positioning face may be an inner face of the positioning hole, the inner face being fitted to at least part of the outer face of the second bearing.

Further, the positioning hole may have a diameter greater than that of the drive shaft, and wherein in the step (e), the positioning member is positioned after the drive shaft passes through the positioning hole, and wherein in the step (f), the second bearing is inserted between the positioning hole of the positioning member and the drive shaft such that the at least part of the outer face of the second bearing is fitted to the inner face of the positioning hole and the inner face of the second bearing is fitted to the outer face of the drive shaft.

Further, the inner face of the positioning hole may be fitted to a protrusion of the outer face of the second bearing.

Further, the inner face of the positioning hole may be provided with a chamfer for guiding the second bearing into the positioning hole.

Further, the second bearing may be a thrust bearing or may include a thrust bearing, and wherein in the step (f), the thrust bearing is adjusted to be perpendicular to a rotation axis of the drive shaft.

Further, in the step (e), the positioning member may be positioned by means of a positioning gauge and/or a positioning clamp.

Further, the method may further include:

enclosing the shell at both ends respectively.

In accordance with a further aspect of the present disclosure, a compressor is provided. The compressor may include:

a shell enclosed by a shell cover and a base at both ends respectively;

a motor arranged in the shell, the motor having:

a stator having a stationary position relative to the shell, a spacer connected to the shell and mounted with a first bearing therein, a drive shaft, an end of which is supported by the first bearing, and a rotor fixed onto the drive shaft and being rotatable relative to the stator;

a low bearing support connected fixedly to the shell or formed integrally with the shell; and a second bearing being connected to the low bearing support and supporting the drive shaft, wherein the low bearing support is provided with a positioning member receiving section, which is configured to fixedly connect the low bearing support to a positioning member for positioning the second bearing during assembling the compressor.

Further, the positioning member receiving section may be provided with connecting holes, connecting columns or connecting grooves configured to connect the positioning member during assembling the compressor.

Further, the at least part of the outer face of the second bearing is capable of being fitted to the positioning member.

Specifically, the outer face of the second bearing may be provided with a bearing flange for connecting the second bearing to the low bearing support, a side face of which is capable of being fitted to the positioning member.

With at least one of the above aspects, the positioning member is provided such that the process of coaxial positioning can be separated from the process of moving the drive shaft. Thus, the adverse effects of gravity of the rotor of the motor and the drive shaft, and the magnetic force between the rotor and the stator on positioning the bearings and the drive shaft can be avoided, and the positioning accuracy and the assembling efficiency can be improved.

DETAILED DESCRIPTION OF THE EMBODIMENTS

Technical solutions of the present disclosure will be described hereinafter in detail by specific embodiments with reference to the accompanying drawings. Throughout the specification, same or similar reference numerals refer to same or similar parts. The description of embodiments with reference to the drawings is intended to explain the general inventive concept of the present disclosure, rather than making any limitations on the present disclosure.

Figure 1:
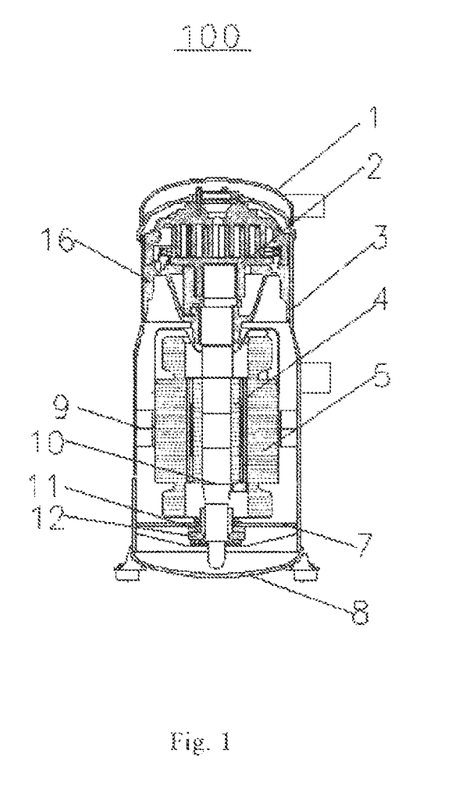
FIG. 1 is a schematic view showing a structure of a compressor according to an embodiment of the present disclosure.

FIG. 1 schematically shows a compressor 100 according to an embodiment of the present disclosure. The compressor 100 includes a shell 3, a motor, a low bearing support 7, a first positioning member 11 and a second bearing 12. At both ends, the shell 3 is enclosed by a shell cover 1 and a base 8 respectively. Thus, a closed chamber is formed in an interior of the shell 3. The motor is arranged in the closed chamber. The motor may include a stator 5, a spacer 16, a drive shaft 10 and a rotor 4. The stator 5 has a stationary location with respect to the shell 3, for example, the stator 5 may be fixed on an inner wall of the shell 3. In an embodiment, the stator 5 may be provided with a flange 9 at its outer periphery, by which the stator 5 is fixed on the inner wall of the shell 3. The spacer 16 is connected to the shell 3 (in an example illustrated in FIG. 1, the spacer 16 is connected to an upper part of the shell 3), for supporting the stator 5, the rotor 4 and the drive shaft 10. The spacer 16 is provided with a first bearing 2. One end of the drive shaft 10 is inserted into the first bearing 2 and supported by it. The rotor 4 is secured on the drive shaft 10 and is rotatable with respect to the stator 5. In the example shown in FIG. 1, the rotor 4 is surrounded by the stator 5. The low bearing support 7 may be fixedly connected to the shell 3 or be integrated with the shell 3.

The first positioning member 11 is connected to the low bearing support 7, and the second bearing 12 is connected to the first positioning member 11 and/or the low bearing support 7 and supports the drive shaft 10. In an example illustrated in FIG. 1, the low bearing support 7 is located within the shell 3 and at a side of the shell 3 adjacent to the base 8, and is fixedly connected to the inner wall of the shell 3. The low bearing support 7 may have an axle hole or an opening to allow the drive shaft 10 to pass therethrough. The low bearing support 7 is used to bear the second bearing 12 to meet requirements for supporting the drive shaft 10. The first positioning member 11 is used to position the second bearing 12. The first positioning member 11 may be a member that is able to be positioned with reference to the first bearing 2 independently of the drive shaft 10 and the second bearing 12. For example, the first positioning member 11 may be a member separated from the drive shaft 10 and the second bearing 12. The second bearing 12 may be connected fixedly to the low bearing support 7 and then be connected to the first positioning member 11 and/or low bearing support 7. Such connections may be done by any conventional connecting means in the art, such as threaded connections. The positioning of the first positioning member 11 may be involved in any one of translation degrees of freedom or rotation degrees of freedom in three-dimensional space. The positioning of the first positioning member 11 may also be related to a combination of the translation degrees of freedom and the rotation degrees of freedom.

Figure 3:
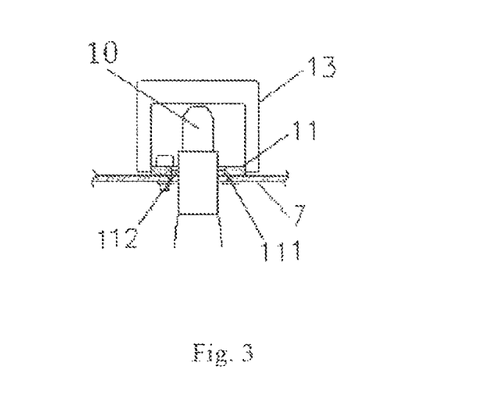
FIG. 3 is a schematic view showing a positioning step of a positioning member in the method of assembling the compressor according to an embodiment of the present disclosure.

As shown in FIG. 3, the first positioning member 11 may have a positioning face 111 fitted to the second bearing 12. Thus, after the first positioning member 11 is positioned with reference to a certain benchmark (for example the first bearing 2), the second bearing 12 may be positioned with respect to the first positioning member 11 by being fitted to the positioning face 111 of the first positioning member 11, such that the second bearing 12 and the benchmark (for example the first bearing 2) can be kept in a correct position relationship, for example, the second bearing 12 and the first bearing 2 can be maintained to be coaxial.

As an example, the first positioning member 11 may have a positioning hole 112. The positioning face 111 is an inner face of the positioning hole 112, which may be fitted to the outer face of the second bearing 12. In this case, after the first positioning member 11 is positioned and connected to the low bearing support 7, the second bearing 12 may be inserted into the positioning hole 112 such that the outer face of the second bearing 12 can be fitted to the inner face of the positioning hole 112 while the inner face of the second bearing 12 can be fitted to the drive shaft 10 to make the second bearing 12 be kept at a correct location. The inner face of the positioning hole 112 may be a cylindrical face. Alternatively, in order to helpfully guide insertion of the second bearing 12, the inner face of the positioning hole 112 may be arranged as a tapered face.

In an embodiment, the positioning hole 112 may have a diameter greater than that of the drive shaft 10. Thus, there is a sufficiently large gap between the positioning hole 112 and the drive shaft 10 when the position of the positioning hole 112 is adjusted, so as to prevent the adjustment to the position of the positioning hole 112 from being subjected to interference with the drive shaft 10.

In an embodiment, as illustrated in FIG. 3, an inner face of the positioning hole 112 may be provided with a chamfer (not labeled) for guiding the second bearing 12 into the positioning hole 112. Correspondingly, an outer face of the second bearing 12 may be provided with a chamfer to facilitate the second bearing 12 to be inserted into the correct position.

The first positioning member 11 may be a positioning ring, i.e., it may have a ring shape. Alternatively, it may be shaped into other forms, such as square, triangle or polygon, and so on. The first positioning member 11 may have the positioning hole as mentioned above, or may have a positioning face in any other forms, such as a positioning end face, a positioning boss, as long as it can achieve the positioning fit to the second bearing 12.

In an embodiment, the second bearing 12 may be a thrust bearing or may include a thrust bearing. The thrust bearing may provide axial support for the drive shaft 10 and may define axial position of the drive shaft 10. In this circumstance, it is necessary to maintain the thrust bearing perpendicular to a rotation axis of the drive shaft 10.

An embodiment of the method of assembling the compressor 100 will be described below. At first, the shell 3, the low bearing support 7, the first positioning member 11, the second bearing 12, as well as the spacer 16, the stator 5, the drive shaft 10 and rotor 4 of the motor may be provided. The stator 5 and the spacer 16 of the motor are mounted fixedly within the shell 3, and the first bearing 2 is mounted in the spacer 16. For example, the stator 5 may be fixed to the shell 3 by connecting the flange 9 on the stator 5 to the inner wall of the shell 3. Then, an end of the drive shaft 10 is fitted into the first bearing 2, and the rotor 4 is fixed onto the drive shaft 10. Next, the low bearing support 7 is connected fixedly to the shell 3.

Figure 2:
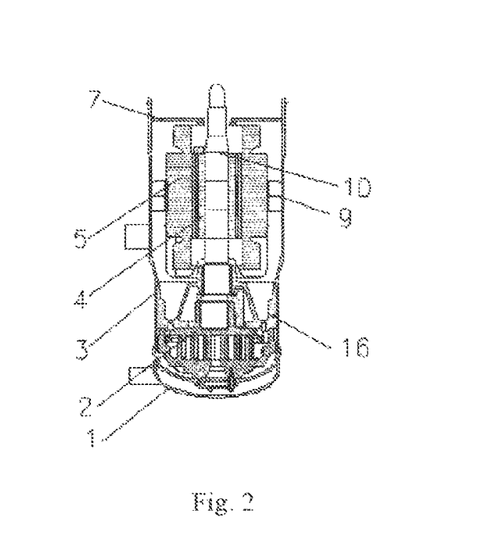
FIG. 2 is a schematic view showing an intermediate process of assembling a compressor by a method of assembling the compressor according to an embodiment of the present disclosure.

FIG. 2 shows schematically the compressor components assembled by the above assembling steps. The shell 3 shown in FIG. 2 is arranged in a direction opposed to the direction in which the construction in FIG. 1 is arranged. Next, it is needed to assemble the first positioning member 11 and the second bearing 12. The first positioning member 11 and the second bearing 12 may be used to maintain the correct position of the drive shaft 10. In the compressor 100, the first bearing 2 and the second bearing 12 for supporting the drive shaft 10 are desired to be arranged coaxially, so as to prevent deflection of the drive shaft 10.

Specifically, at first, the first positioning member 11 is positioned with reference to the first bearing 2. The positioning of the first positioning member 11 may be performed by means of a positioning tool 13, which may for example be a positioning gauge or a positioning clamp. After the positioning of the first positioning member 11 is finished, the positioned first positioning member 11 is connected fixedly to the low bearing support 7.

Figure 4:
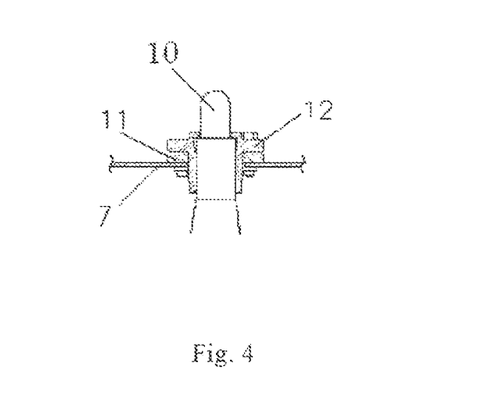
FIG. 4 is a schematic view showing mounting locations of a second bearing and the positioning member in the compressor according to an embodiment of the present disclosure.

Next, the second bearing 12 and the drive shaft 10 are positioned with reference to the first positioning member 11, such that the first bearing 2 and the second bearing 12 are coaxial, and the positioned second bearing 12 may be connected fixedly to the first positioning member 11 and/or the low bearing support 7.

By an example in which the first positioning member 11 has a positioning hole 112 and the inner face of the positioning hole 112 is arranged as the positioning face 111 fitted to the second bearing 12, the assembly of the first positioning member 11 and the second bearing 12 will be described below in more details.

At first, the drive shaft 10 passes through the positioning hole 112, and the position of the first positioning member 11 is adjusted, for example, the inner face of the positioning hole 112 of the first positioning member 11 may be adjusted to be coaxial to the first bearing 2. The positioning of the first positioning member 11 may be done for example by the positioning tool, such as the positioning gauge, the positioning clamp, or even by adjusting tightness of screws distributed on various locations of the first positioning member 11. The position adjustments to the first positioning member 11 may include adjustments to translation position and/or adjustments to tilting position. The positioning of the first positioning member 11 may be done by other technical means known for those skilled in the art. The first positioning member 11 may be fixed on the low bearing support 7, after it is positioned in place.

Then, the second bearing 12 is inserted between the positioning hole 112 of the first positioning member 11 and the drive shaft 10, such that the outer face of the second bearing 12 is fitted to the inner face of the positioning hole 112 and the inner face of the second bearing 12 is fitted to the outer face of the drive shaft 10. As the second bearing 12 is inserted, the second bearing 12 propels the drive shaft 10 against the magnetic field force between the rotor 4 and the stator 5 to maintain the drive shaft 10 in position. As the inner face of the positioning hole 112 has been adjusted to be coaxial to the first bearing 2, the second bearing 12 fitted to the inner face of the positioning hole 112 is also located in a position which is coaxial to the first bearing 2 in aid of guidance of the positioning hole 112.

The diameter of the positioning hole 112 may be greater than that of the corresponding part of the drive shaft 10, such that there can be a sufficient large gap between the positioning hole 112 and the drive shaft 10 when the position of the positioning hole 112 is adjusted, so as to prevent the adjustments to the position of the positioning hole 112 from interfering with the drive shaft 10. In the prior art, the second bearing 12 mounted on the drive shaft 10 is directly positioned by means of a positioning apparatus, rather than the first positioning member 11 described herein. In this way, the position adjustments of the second bearing 12 will be disturbed by the magnetic field force between the rotor 4 on the drive shaft 10 and the stator 5, and thus it is difficult to finish an accurate positioning. In contrast, in the embodiment according to the present disclosure, the positioning operation is separated from the mounting operation of the second bearing 12 to avoid the effects of substantial disturbing force during positioning operation of the first positioning member 11. In addition, as the second bearing 12 can be mounted under guidance of the first positioning member 11, the convenience of the operation can also be improved.

In an embodiment, the inner face of the positioning hole 112 is provided with a chamfer which may allow the second bearing 12 to be inserted more conveniently and accurately. Similarly, the outer face of the second bearing 12 may also be provided with a chamfer.

In the case where the second bearing 12 is the thrust bearing or includes the thrust bearing, the positioning face 111 of the first positioning member 11 is adjusted to be perpendicular to the rotation axis of the drive shaft 10 while being adjusted to be coaxial to the first bearing 2.

Figure 5A:
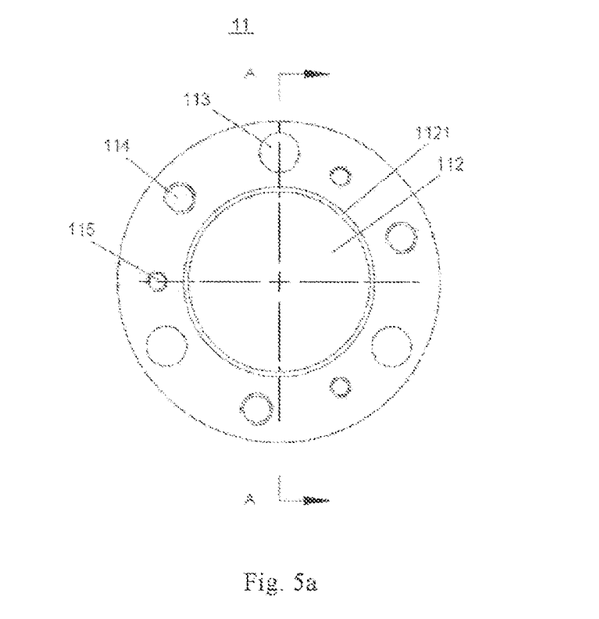
FIG. 5a and FIG. 5b are a front view and a cross sectional view schematically showing the positioning member according to an embodiment of the present disclosure, respectively.
Figure 5B:
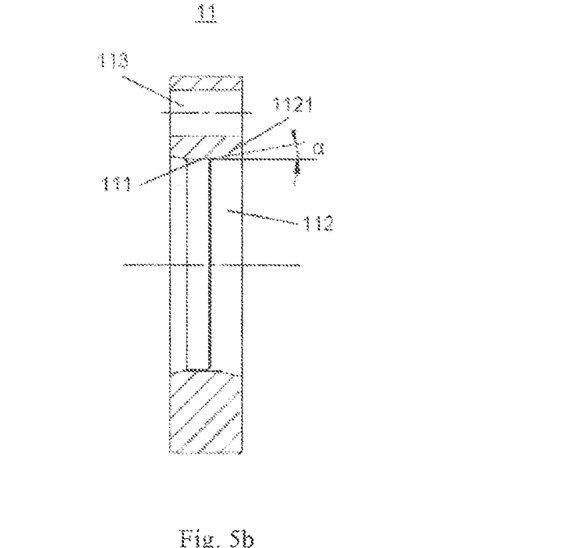

FIGS. 5a and 5b illustrate an example of the first positioning member 11, which has a positioning hole 112 at its center. A chamfer portion 1121 for guiding the insertion of the second bearing 12 is provided at an edge of the inner face of the positioning hole 112. A tilt angle α of the chamfer portion 1121 may be determined as desired, for example 5°~15°, such as 10°. FIG. 5a is a front view of the first positioning member 11 and FIG. 5b is a cross sectional view cut along line A-A in FIG. 5a. In the embodiment shown in FIG. 5a and FIG. 5b, the first positioning member 11 may also be provided with fixing holes 113, 114 and 115 for fixing the first positioning member 11 (for example by means of screws or bolts). The fixing holes 113, 114 and 115 may have various diameters, may be through holes, or may be threaded holes. Three sets of fixing holes (nine fixing holes in total) as shown may meet various requirements on fixing, however this case is not necessary. Users may select and use any of these fixing holes to achieve fixing.

Figure 6:
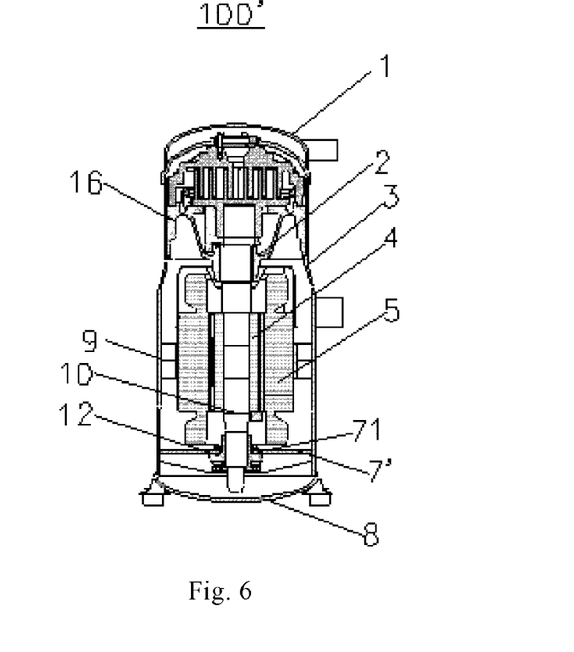
FIG. 6 is a schematic view showing a structure of a compressor according to another embodiment of the present disclosure.

FIG. 6 shows schematically a compressor 100' according to another embodiment of the present disclosure. The compressor 100' may include a shell 3, a motor, a low bearing support 7' and a second bearing 12. At both ends, the shell 3 is enclosed by a shell cover 1 and a base 8 respectively. Thus, a closed chamber is formed in an interior of the shell 3. The motor is arranged in the closed chamber. The motor includes a stator 5, a spacer 16, a drive shaft 10 and a rotor 4. The stator 5 has a stationary location relative to the shell 3, for example, the stator 5 may be fixed on an inner wall of the shell 3. In an embodiment, the stator 5 may be provided with a flange 9 at its outer periphery, by which the stator 5 is fixed on the inner wall of the shell 3. The spacer 16 is connected to the shell 3 (in an example illustrated in FIG. 6, the spacer 16 is connected to an upper part of the shell 3), for supporting the stator 5, the rotor 4 and the drive shaft 10. The spacer 16 is provided with a first bearing 2. One end of the drive shaft 10 is inserted into the first bearing 2 and supported by the first bearing 2. The rotor 4 is fixed on the drive shaft 10 and is rotatable with respect to the stator 5. In the example shown in FIG. 6, the rotor 4 is surrounded by the stator 5. The low bearing support 7' may be fixedly connected to the shell 3 or be integrated with the shell 3.

The second bearing 12 is mounted on the low bearing support 7', and is used to support the drive shaft 10. In an example illustrated in FIG. 6, the low bearing support 7' is located within the shell 3 and at a side of the shell 3 adjacent to the base 8, and is fixedly connected to the inner wall of the shell 3. The low bearing support 7' may have an axle hole or an opening to allow the drive shaft 10 to pass through the low bearing support 7'. The low bearing support 7' is used to bear the second bearing 12 to meet the requirement for supporting the drive shaft 10. During mounting the second bearing 12, it is needed to adjust accurately the relative position of the second bearing 12 and the first bearing 2, so as to ensure that the positions of the drive shaft 10, the first bearing 2 and the second bearing 12 can meet the working requirement of the compressor. For example, the second bearing 12 may need to be adjusted to be coaxial to the first bearing 2. As an example, again, the second bearing 12 may be a thrust bearing or include a thrust bearing, which may provide the axial support for the drive shaft 10 and may restrict the axial position of the drive shaft 10. In this circumstance, it is necessary to maintain the thrust bearing perpendicular to the rotation axis of the drive shaft 10.

Figure 8:
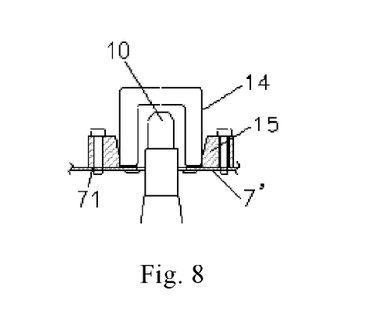
FIG. 8 is a schematic view showing a positioning step of a positioning member in the method of assembling the compressor according to another embodiment of the present disclosure.

As shown in FIG. 8, in order to achieve an improved positioning of the second bearing 12, a second positioning member 15 may be mounted on the low bearing support 7' during the assembling process of the compressor. To this end, the low bearing support 7' may be provided with a positioning member receiving section 71, which fixedly connects the second positioning member 15 for positioning the second bearing 12 to the low bearing support 7' during the assembling process of the compressor. The positioning member receiving section 71 may be provided with connecting holes, connecting columns or connecting grooves, for connecting the second positioning member 15 during the assembling process of the compressor. In an embodiment, in order to achieve an improved positioning function of the second positioning member 15, at least part of an outer face of the second bearing 12 may be arranged to be fitted to the second positioning member 15. The second bearing 12 may be arranged such that its whole outer face is fitted to the second positioning member 15, or may be designed such that only a part of the outer face of the second bearing 12 can be fitted to the second positioning member 15. For example, the outer face of the second bearing 12 may be provided with a bearing flange 121 connecting the second bearing 12 to the low bearing support 7'. The side face 18 of the bearing flange 121 is capable of being fitted to the second positioning member 15. The second positioning member 15 is different from the first positioning member 11 described in the previous embodiment mainly in that the second positioning member 15 can be removed from the compressor after the compressor is assembled, instead of being remained within the compressor. Structures, functions and applications for the second positioning member 15 will be explained in details below.

Next, an embodiment of the method of assembling the compressor 100' will be described. At first, the shell 3, the low bearing support 7', the second bearing 12, the second positioning member 15, as well as the spacer 16, the stator 5, the drive shaft 10 and the rotor 4 of the motor may be provided. The stator 5 and the spacer 16 of the motor are mounted fixedly within the shell 3, and the first bearing 2 is mounted in the spacer 16. For example, the stator 5 may be fixed to the shell 3 by connecting the flange 9 on the stator 5 to the inner wall of the shell 3. Then, an end of the drive shaft 10 is fitted into the first bearing 2, and the rotor 4 is fixed onto the drive shaft 10. Next, the low bearing support 7' is connected fixedly to the shell 3.

Figure 7:
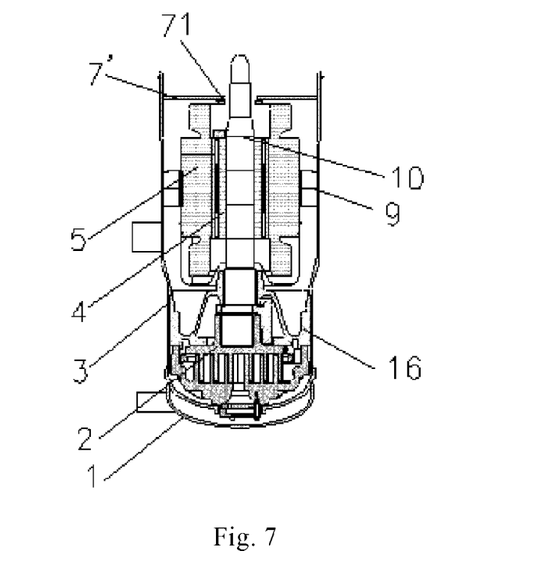
FIG. 7 is a schematic view showing an intermediate process of assembling a compressor by a method of assembling the compressor according to another embodiment of the present disclosure.

FIG. 7 shows schematically the compressor components assembled by the above assembling steps. The shell 3 of the compressor shown in FIG. 7 is arranged in a direction opposed to the direction in which the construction in FIG. 6 is arranged. Next, it is needed to assemble the second bearing 12. As mentioned above, in the compressor 100', the first bearing 2 and the second bearing 12 for supporting the drive shaft 10 are desired to be arranged coaxially, so as to prevent deflection of the drive shaft 10. Thus, the second bearing 12 should be positioned with reference to the first bearing 2.

Specifically, at first, the second positioning member 15 is positioned with reference to the first bearing 2. The positioning of the second positioning member 15 may be performed by means of a positioning tool 14, which may for example be a positioning gauge or a positioning clamp. After the second positioning member 15 is positioned, the positioned second positioning member 15 is connected fixedly to the low bearing support 7', for example connected to the positioning member receiving section 71.

Figure 9:
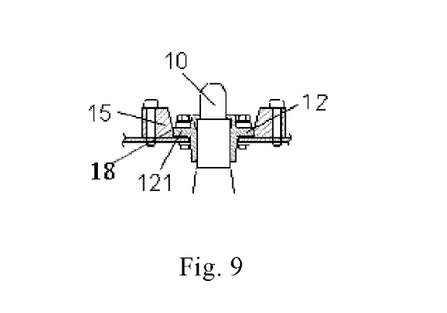
FIG. 9 is a schematic view showing mounting locations of a second bearing and the positioning member in the compressor according to another embodiment of the present disclosure.

Next, the second bearing 12 and the drive shaft 10 may be positioned with reference to the second positioning member 15 such that the first bearing 2 and the second bearing 12 are coaxial and the positioned second bearing 12 is connected fixedly to the low bearing support 7', for example by conventional connecting means in the art, such as threading connections.

After fixing the second bearing 12, the second positioning member 15 may be removed from the low bearing support 7' to allow the second positioning member 15 to be used to assemble other compressors. Removing the second positioning member 15 timely, instead of remaining it in the finished product of the compressor, not only can save the space of the compressor, but also can improve the use efficiency of the second positioning member 15.

The second positioning member 15 may be a member that is able to be positioned with reference to the first bearing 2 independently of the drive shaft 10 and the second bearing 12. For example, before the second bearing 12 is mounted, the second positioning member 15 may be clamped by the positioning tool 14, and positioned in place relative to the first bearing 2, and thus fixed to the low bearing support 7' at this position. The positioning of the second positioning member 15 may be involved in any one of translation degrees of freedom or rotation degrees of freedom in three-dimensional space. The positioning of the first positioning member 11 may also be involved in a combination of the translation degrees of freedom and the rotation degrees of freedom.

Figure 10:
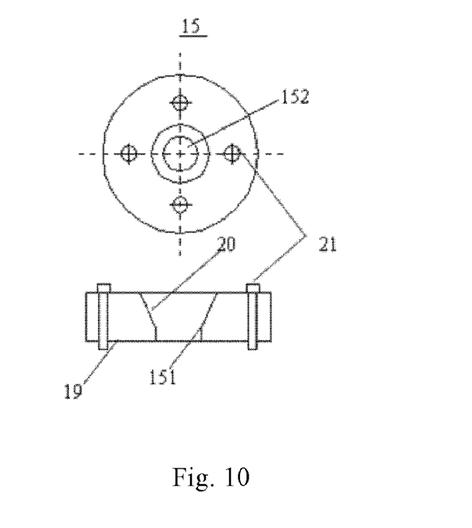
FIG. 10 is a schematic view showing the positioning member for assembling a compressor according to another embodiment of the present disclosure.

As shown in FIG. 10, the second positioning member 15 may have a positioning face 151 fitted to the second bearing 12. Thus, after the second positioning member 15 is positioned with reference to a certain datum (for example the first bearing 2), the second bearing 12 may be positioned with respect to the second positioning member 15 by being fitted to the positioning face 151 of the second positioning member 15, such that the second bearing 12 and the datum (for example the first bearing 2) can remain correct position relationship, for example, the second bearing 12 and the first bearing 2 can be maintained to be coaxial.

As an example, the second positioning member 15 may have a positioning hole 152. The positioning face 151 is the inner face of the positioning hole 152, which may be fitted to the outer face of the second bearing 12. In this case, after the second positioning member 15 is positioned and connected to the low bearing support 7', the second bearing 12 may be inserted into the positioning hole 152 such that the outer face of the second bearing 12 can be fitted to the inner face of the positioning hole 152 and the inner face of the second bearing 12 can be fitted to the drive shaft 10 to make the second bearing 12 be kept at a correct location.

In an embodiment, the positioning hole 152 may have a diameter greater than that of the drive shaft 10. Thus, there may be a sufficiently large gap between the positioning hole 152 and the drive shaft 10 when the position of the positioning hole 152 is adjusted, so as to prevent the adjustment to the position of the positioning hole 152 from interfering with the drive shaft 10.

In an embodiment, as illustrated in FIGS. 8 and 10, an inner face of the positioning hole 152 may be provided with a chamfer 20 for guiding the second bearing 12 to be inserted into the positioning hole 152 and thus the operation of guiding the insertion of the second bearing 12 can be more convenient and accurate. Correspondingly, an outer face of the second bearing 12 may also be provided with a chamfer to facilitate the second bearing 12 to be inserted into the correct position. The inner face of the positioning hole 152 may be a cylindrical face. Alternatively, in order to conveniently guide the second bearing 12 to be inserted, the inner face of the positioning hole 152 may be arranged as a tapered face.

As illustrated in FIG. 10, the second positioning member 15 may have a ring shape. However, it may also be shaped into other forms, such as square, triangle or polygon. The second positioning member 15 may have the positioning hole as mentioned above, or may have a positioning face in other shapes, such as a positioning end face, a positioning boss, as long as it can achieve the positioning fit to the second bearing 12. The second positioning member 15 may be provided with connecting holes (as shown in FIG. 10) corresponding to the positioning member receiving section 71 of the low bearing support 7', which are used to be connected to the positioning member receiving section 71, for example by bolts 21 passing through the connecting holes. However, the connecting holes in the second positioning member 15 may be replaced by connecting grooves, connecting columns or other connecting means in the art.

By an example in which the second positioning member 15 has a positioning hole 152 and the inner face of the positioning hole 152 is arranged as the positioning face 151 fitted to the second bearing 12, the assembly of the second positioning member 15 and the second bearing 12 will be described below in more details.

At first, the drive shaft 10 passes through the positioning hole 152, and the position of the second positioning member 15 is adjusted, for example, the inner face of the positioning hole 152 of the second positioning member 15 may be adjusted to be coaxial to the first bearing 2. The positioning of the second positioning member 15 may be done for example by the positioning tool 14, such as the positioning gauge, the positioning clamp, or even by adjusting tightness of screws distributed on various locations of the second positioning member 15. The position adjustments of the second positioning member 15 may include adjustments to translation position and/or adjustments to tilting position. The positioning of the second positioning member 15 may be done by other technical means known in the art for those skilled persons. The second positioning member 15 may be fixed on the low bearing support 7' after it is positioned in place.

Then, the second bearing 12 may be inserted between the positioning hole 152 of the second positioning member 15 and the drive shaft 10 such that the outer face of the second bearing 12 can be fitted to the inner face of the positioning hole 152 and the inner face of the second bearing 12 can be fitted to the outer face of the drive shaft 10. As the second bearing 12 is inserted, the second bearing 12 propels the drive shaft 10 against the magnetic field force between the rotor 4 and the stator 5 to maintain the drive shaft 10 in position. As the inner face of the positioning hole 152 has been adjusted to be coaxial to the first bearing 2, the second bearing 12 fitted to the inner face of the positioning hole 152 is also located in a position which is coaxial to the first bearing 2 in aid of guidance of the positioning hole 152.

The diameter of the positioning hole 152 may be greater than that of the corresponding part of the drive shaft 10, such that there can be a sufficient large gap between the positioning hole 152 and the drive shaft 10 when the position of the positioning hole 152 is adjusted, so as to prevent the adjustments to the position of the positioning hole 152 from interfering with the drive shaft 10. In the prior art, the second bearing 12 mounted on the drive shaft 10 is directly positioned by means of a positioning apparatus, rather than the second positioning member 15 herein. In this way, the adjustments to the position of the second bearing 12 will be disturbed by the magnetic field force between the rotor 4 on the drive shaft 10 and the stator 5 and/or gravity of the drive shaft 10, and thus it is difficult to finish an accurate positioning. In contrast, in the embodiment according to the present disclosure, the positioning operation of the second bearing 12 is separated from the mounting operation thereof to avoid the effects of substantial disturbing force from the drive shaft 10 during the positioning operation of the second positioning member 15. In addition, as the second bearing 12 can be mounted under the guidance of the second positioning member 15, the convenience of the operation can also be improved.

In the case where the second bearing 12 is the thrust bearing or includes the thrust bearing, the positioning face 151 of the second positioning member 15 is adjusted to be perpendicular to the rotation axis of the drive shaft 10 while being adjusted to be coaxial to the first bearing 2.

In the example shown in FIGS. 9 and 10, the inner face of the positioning hole of the second positioning member 15 is a cylindrical face, which is fitted to the side face 18 of a bearing flange 121 to keep a bottom face 19 of the second positioning member 15 perpendicular to the positioning face 151 (i.e., the inner face of the positioning hole 152) of the second positioning member 15. It can keep the second bearing 12 perpendicular to the rotation axis of the drive shaft 10. The inner face of the positioning hole 152 may be provided with a chamfer 20 having a suitable angle, so that it may allow the side face 18 of the bearing flange 121 to be guided into the positioning hole 152 conveniently and thus to be fitted to the positioning face 151.

In any of the above methods of assembling compressor, the both ends of the shell 3 may be enclosed, for example by the shell cover 1 and the base 8.

In any of the embodiments according to the present disclosure, the compressor may be for example a permanent magnet motor-type refrigeration compressor, i.e., the refrigeration compressor with a permanent magnet motor.

Although the embodiments of the present disclosure have been described in conjunction with figures, they are only examples for explaining the present disclosure and are not intended to limit the present disclosure.

Although some embodiments for the general concept of the present disclosure have been shown and explained, the skilled person in the art will appreciate that modifications to the above embodiments can be carried out without departing from the spirit and principle of the present general inventive concept. The scope of the present disclosure should be defined by the appended claims and equivalents thereof.

What is claimed is:

1. A method of assembling a compressor, comprising:
   (a) providing a shell, a low bearing support, a positioning member, a second bearing, as well as a spacer, a stator, a drive shaft and a rotor of a motor;
   (b) mounting the stator and the spacer of the motor fixedly in the shell, the spacer being mounted with a first bearing;
   (c) fitting an end of the drive shaft to the first bearing and fixing the rotor onto the drive shaft;
   (d) connecting the low bearing support to the shell fixedly;
   (e) positioning the positioning member with reference to the first bearing and connecting the positioned positioning member to the low bearing support fixedly; and
   (f) positioning the second bearing and the drive shaft with reference to the positioning member such that the first bearing and the second bearing are coaxial, and connecting the positioned second bearing to the positioning member and/or the low bearing support fixedly.

2. The method according to claim 1, further comprising:
   (g) removing the positioning member from the low bearing support.

3. The method according to claim 1, wherein the positioning member has a positioning face fitted to the second bearing.

4. The method according to claim 3, wherein the positioning member has a positioning hole, and wherein the positioning face is an inner face of the positioning hole, the inner face being fitted to an outer face of the second bearing.

5. The method according to claim 4, wherein the positioning hole has a diameter greater than that of the drive shaft, and wherein in the step (e), the positioning member is positioned after the drive shaft passes through the positioning hole, and wherein in the step (f), the second bearing is inserted between the positioning hole of the positioning member and the drive shaft such that the outer face of the second bearing is fitted to the inner face of the positioning hole and an inner face of the second bearing is fitted to an outer face of the drive shaft.

6. The method according to claim 5, wherein the inner face of the positioning hole is provided with a chamfer for guiding the second bearing into the positioning hole, and wherein the outer face of the second bearing has a chamfer.

7. The method according to claim 2, wherein the positioning member has a positioning face fitted to the second bearing.

8. The method according to claim 3, wherein the positioning member has a positioning hole, and wherein the positioning face is an inner face of the positioning hole, the inner face being fitted to an outer face of the second bearing.

9. The method according to claim 4, wherein the positioning hole has a diameter greater than that of the drive shaft, and wherein in the step (e), the positioning member is positioned after the drive shaft passes through the positioning hole, and wherein in the step (f), the second bearing is inserted between the positioning hole of the positioning member and the drive shaft such that the outer face of the second bearing is fitted to the inner face of the positioning hole and an inner face of the second bearing is fitted to an outer face of the drive shaft.

10. The method according to claim 8, wherein the inner face of the positioning hole is fitted to a protrusion of the outer face of the second bearing.

11. The method according to claim 8, wherein the inner face of the positioning hole is provided with a chamfer for guiding the second bearing into the positioning hole.

12. The method according to claim 1, wherein the second bearing is a thrust bearing or comprises a thrust bearing, and wherein in the step (ft the thrust bearing is adjusted to be perpendicular to a rotation axis of the drive shaft.

13. The method according to claim 1, wherein in the step (e), the positioning member is positioned by means of a positioning gauge and/or a positioning clamp.

14. The method according to claim 1, further comprising:
   enclosing the shell at both ends respectively.

* * * * *

UNITED STATES PATENT AND TRADEMARK OFFICE
CERTIFICATE OF CORRECTION

PATENT NO. : 10,495,087 B2
APPLICATION NO. : 15/153212
DATED : December 3, 2019
INVENTOR(S) : Zhou Xueyou et al.

Page 1 of 1

It is certified that error appears in the above-identified patent and that said Letters Patent is hereby corrected as shown below:

In the Claims

Column 14, Claim 8, Line 8, after "according to claim," please delete "3" and insert -- 7 -- and in Line 11, after "being fitted to", please insert -- at least part of --.

Column 14, Claim 9, Line 13, after "according to claim," please delete "4" and insert -- 8 -- and in Line 19, after "shaft such that", please insert -- the at least part of --.

Column 14, Claim 12, Line 32, after "wherein in the step" please delete "(ft" and insert -- (f), --.

Signed and Sealed this
Third Day of March, 2020

Andrei Iancu
*Director of the United States Patent and Trademark Office*